Jan. 6, 1970     R. F. MILLER     3,488,077
LONGITUDINALLY SHIFTABLE BUMPER
Filed June 4, 1968
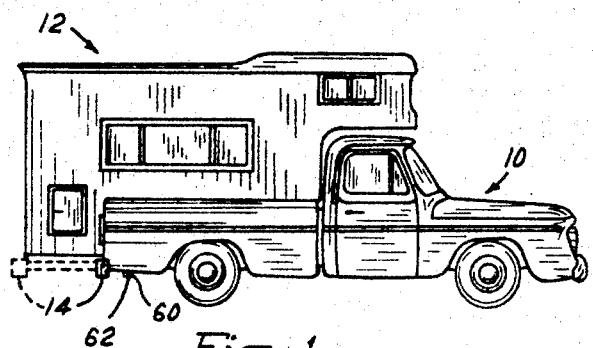
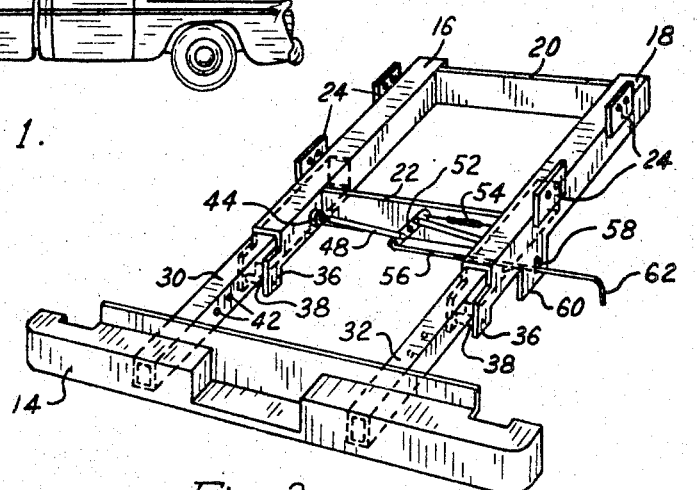
Robert F. Miller
INVENTOR
BY Oliver Q. Olson
Agent

United States Patent Office 3,488,077
Patented Jan. 6, 1970

3,488,077
LONGITUDINALLY SHIFTABLE BUMPER
Robert F. Miller, Winberry Ranch,
Fall Creek, Oreg. 97438
Filed June 4, 1968, Ser. No. 734,395
Int. Cl. B60r 19/02, 27/00
U.S. Cl. 293—73                                6 Claims

ABSTRACT OF THE DISCLOSURE

A vehicle bumper is attached to a pair of laterally spaced, elongated arms which are supported telescopically in hollow, elongated tubes secured under the vehicle frame. Bearing rollers on the rear ends of the tubes and forward ends of the arms support the latter for easy extension and retraction. Registering openings in the arms and tubes receive retractable locking pins connected by links to a pivoted lever which is operated by a rod extending laterally from the lever to a position adjacent the lateral side of the vehicle.

BACKGROUND OF THE INVENTION

This invention relates to vehicle bumpers, and more particularly to an extensible bumper for use on vehicles adapted to mount campers of varying lengths.

Extensible bumpers of the class described have been provided heretofore for adjustable extension rearwardly beyond campers of varying lengths. Such bumpers have not been completely satisfactory, however, primarily because of the necessity to crawl under the vehicle to effect extension and retraction of the bumper. Further, such bumpers have been difficult to extend and retract because of the excessive friction between relatively movable parts thereof.

SUMMARY OF THE INVENTION

In its basic concept, the present invention provides an extensible bumper in which the longitudinally adjustable bumper support members are interengaged by bearing rollers to minimize friction and are locked together releasably by means operable at the lateral side of the vehicle.

It is by virtue of the foregoing basic concept that the principal object of the present invention is achieved, namely to overcome the disadvantages of prior extensible bumpers, as enumerated hereinbefore.

Another important object of the present invention is the provision of an extensible bumper of simplified and economical construction and which is attachable to vehicles with speed and facility.

The foregoing and other objects and advantages of this invention will appear from the following detailed description, taken in connection with the accompanying drawing of the preferred embodiment.

BRIEF DESCRIPTION OF THE DRAWINGS

FIG. 1 is a side elevation showing a pickup truck having a camper mounted thereon and further showing in dash lines an extended position of a bumper embodying the features of the present invention.

FIG. 2 is a perspective view of an extensible bumper embodying the features of the present invention.

FIG. 3 is a fragmentary side elevation of a portion of the bumper assembly shown in FIG. 2.

FIG. 4 is a sectional view taken on the lines 4—4 in FIG. 3.

DESCRIPTION OF THE PREFERRED EMBODIMENT

For purposes of illustration, FIG. 1 shows a pickup truck 10 mounting a camper 12 which extends rearward beyond the normal position of the rear bumper 14 of the truck. Since campers of varying length extend rearward to varying distances beyond the rearward end of the truck, it is necessary to provide a bumper which is extensible to varying distances rearward of the truck. The preferred form of extensible bumper embodying the features of the present invention is illustrated in FIGS. 2, 3, and 4.

The bumper of the present invention includes a bumper support frame adapted to be attached under the frame of the vehicle. The bumper support frame includes a pair of laterally spaced, elongated tubes 16 and 18 interconnected by longitudinally spaced transverse beams 20 and 22. A plurality of brackets 24 are secured, as by welding, to the outer sides of the tubes and project upward therefrom for receiving between them the laterally spaced members 26 of the vehicle frame. The brackets are secured to the vehicle frame members by such means as the bolts 28 which are adapted to extend through registering openings provided in the brackets and vehicle frame members.

The rearward ends of a pair of laterally spaced, elongated bumper support arms 30 and 32 are secured to the transverser ear bumper member 14. These ams extend freely into the tubes 16 and 18 of the bumper support frame for telescopic extension and retraction.

Means is provided for minimizing friction between the relatively movable tubes and arms. To this end said members preferably are made of square or rectangular stock, and there is mounted at the forward end of each of the arms a bearing roller 34 (FIG. 3) positioned for rolling engagement with the upper, inner surface of the associated tube. At the rearward end of each tube a pair of laterally spaced, downwardly projecting tabs 36 mount a bearing roller 38 between them for rolling engagement with the external bottom surface of the associated arm. Thus, by means of these rollers the bumper member may be extended and retracted with minimum effort.

Means is provided for securing the bumper member 14 releasably in various positions of extension and retraction. In the embodiment illustrated the inner side wall of each tube is provided with a transverse opening 40 (FIG. 4) and the corresponding inner wall of each arm is provided with a plurality of longitudinally spaced openings 42, each adapted to register with the associated opening 40 at predetermined positions of extension and retraction of the bumper member. The opening in each tube registers with the axial bore in a guide sleeve 44 secured to the outer side of the tube by such means as welding. The guide sleeve slidably mounts a locking pin 46 which is reciprocative freely therein for retractable insertion through the opening 40 and any one of the openings 42 which registers therewith. The locking pin thus functions releasably to secure each tube and associated arm together in selected positions of adjustment.

The inner end of each locking pin 46 is connected pivotally through a link member 48 to a lever 50 mounted pivotally on the rearward transverse beam 22 by means of the pivot pin 52. This pivot pin is located between the connections of the link members 48 to the lever.

A resilient coil spring 54 interconnects the bumper support frame and the lever in such manner as to urge the locking pins 46 in the direction of insertion through registering openings 40, 42.

Means is provided for pivoting the lever 50 to retract the locking pins, from a convenient position adjacent the lateral side of the vehicle 10. To this end, an elongated operating rod 56 is connected pivotally at its inner end to the lever and extends laterally therefrom through a guide opening 58 in a bracket 60 secured to and depending downward from one of the tubes. The outer end of the rod is bent or otherwise formed with a handle 62 by which to manipulate it.

Means also is provided for retaining the locking pins 46 in retracted position, against the tension of the spring 54, to enable the operator to readjust the position of extension or retraction of the bumper member. In the embodiment illustrated such means is provided by the stop member 64 which is secured to, and projects from, the operating rod 56 intermediate the ends of the latter and adjacent the bracket 60 defining the guide opening 58. The guide opening is large enough to permit the stop member to pass through it as the operating rod is moved laterally to pivot the lever. Thus, as best illustrated in FIG. 4, the stop member 64 is located inward of the guide opening bracket 60 when the operating rod 56 is moved inward and the locking pins 46 are in locking position, as illustrated in full lines. When the operating rod is pulled laterally outward to pivot the lever 50 and retract the locking pins, as illustrated in dash lines, the stop member 64 passes outward through the guide opening 58 and abuts the outer side of the bracket 60. The locking pins thus are retained in retracted position. When it is desired to return the locking pins to locking position, the outer end of the operating rod 56 is lifted upward to allow the stop member 64 to disengage from the bracket and pass inward through the guide opening 58 as the spring 54 pivots the lever 50 clockwise and urges the locking pins 46 toward locking position.

In changing the position of extension or retraction of the bumper member 14, the operator moves to the side of the vehicle 10 on which the handle 62 of the operating rod is located and pulls the operating rod outward until the stop member 64 passes through the guide opening 58 and engages the bracket 60. The operator then moves to the rear of the vehicle and, grasping the bumper member 14, pushes inward or pulls outward thereon until the bumper member is located approximately at its desired position. The operator then returns to the side of the vehicle and lifts upward on the operating rod 56 to disengage the stop member 64 from the bracket 60. The spring 54 thereupon urges the operating rod laterally inward, the stop member passing through the guide opening 58. However, it is likely that the locking pins 46 yet do not register with one of the plurality of openings 42 in the arms, and thus are not yet moved to locking position. The operator thereupon returns to the rear of the vehicle and, grasping the bumper member 14, moves the latter forward or rearward, as desired, until the appropriate openings 42 in the arm register with the locking pins 46. The spring 54 thereupon urges the locking pins into said openings, whereby the arms 30 and 32 are secured to the associated tubes 16 and 18.

From the foregoing it will be appreciated that the present invention provides an extensible bumper of simplified and economical construction which may be attached to a vehicle with speed and facility and with a minimum of alteration of the vehicle. In this regard, it is required only that openings be drilled in the vehicle frame members 26 for receiving the attaching bolts 28. Extension and retraction of the bumper member is accomplished with minimum effort, by the provision of the bearing rollers 34 and 38. Release of the locking mechanism is accomplished conveniently from the side of the vehicle by the provision of the operating rod 56.

It will be apparent to those skilled in the art that various changes in the size, shape, number and arrangement of parts described hereinbefore may be made without departing from the spirit of this invention.

Having now described my invention and the manner in which it may be used, I claim:

1. An extensible bumper for vehicles, comprising:
   (a) a bumper support frame including a transverse member interconnecting a pair of laterally spaced, elongated tubular members,
   (b) attaching means on the bumper support frame for securing the latter to a vehicle frame,
   (c) a bumper member,
   (d) a pair of laterally spaced, elongated support arms secured at their rear ends to the bumper member and extending forward freely into the tubular members,
   (e) locking means mounted on the transverse member of the bumper support frame for movement between an operative position securing together the bumper support frame and support arms and inoperative position releasing the support arms from the bumper support frame for extension and retraction of the bumper member, and
   (f) lock operating means engaging the locking means and extending laterally of the bumper support frame to a position adjacent the lateral side of the vehicle.

2. The extensible bumper of claim 1 including
   (a) roller means mounted on the forward ends of the support arms for rolling engagement with the interior of the tubular members, and
   (b) roller means mounted on the rearward ends of the tubular members for rolling engagement with the exterior of the support arms.

3. The extensible bumper of claim 1 wherein
   (a) the locking means including
      (1) a lever mounted pivotally on the transverse member of the bumper support frame, and
      (2) locking pin means connected to the lever for retractable insertion in registering openings in the tubular members and support arms,
   (b) the lock operating means comprises an elongated rod connected at one end to the lever and extending laterally through a guide opening in the bumper support frame, and
   (c) a stop member on the rod is movable with the latter through said guide opening for releasable abutment with the outer side of the bumper support frame for retaining the rod in laterally extended position and the locking pin means in retracted position.

4. The extensible bumper of claim 1 including
   (a) roller means mounted on the forward ends of the support arms for rolling engagement with the interior of the tubular members,
   (b) roller means mounted on the rearward ends of the tubular members for rolling engagement with the exterior of the support arms, and wherein
   (c) the locking means includes
      (1) a lever mounted pivotally on the transverse member of the bumper support frame,
      (2) locking pin means connected to the lever for retractable insertion in registering openings in the tubular members and support arms, and
      (3) resilient means interengaging the lever and bumper support frame and urging the locking pins toward locking position,
   (d) the lock operating means comprises an elongated rod connected at one end to the lever and extending laterally through a guide opening in the bumper support frame, and
   (e) a stop member on the rod movable with the latter through said guide opening for releasable abutment with the outer side of the bumper support frame for retaining the rod in laterally extending position and the locking pin means in retracted position.

5. An extensible bumper for vehicles, comprising:
   (a) a bumper support frame including a pair of laterally spaced, elongated tubular members,
   (b) attaching means on the bumper support frame for securing the latter to a vehicle frame,
   (c) a bumper member,
   (d) a pair of laterally spaced, elongated support arms secured at their rear ends to the bumper member and extending forward freely into the tubular members,
   (e) roller means mounted on the forward ends of the support arms in rolling engagement with the upper, inner surfaces of the tubular members,
(f) roller means mounted on the rearward ends of the tubular members and supporting the outer, bottom surfaces of the support arms, and
(g) releasable locking means on the support frame interengaging the tubular members and support arms for securing the latter releasably to the tubular members in adjusted positions of extension and retraction.

6. The extensible bumper of claim 5 including lock operating means engaging the locking means and extending laterally of the bumper support frame to a position adjacent the lateral side of the vehicle.

References Cited

UNITED STATES PATENTS

| | | | |
|---|---|---|---|
| 1,330,655 | 2/1920 | Radeleff | 298—38 |
| 1,447,387 | 3/1923 | Heil et al. | 293—73 XR |
| 1,463,743 | 7/1923 | Lankston | 298—38 |
| 1,474,929 | 11/1923 | Fagan | 5—119 |
| 1,504,679 | 8/1924 | Dietz | 293—73 |
| 1,515,111 | 11/1924 | Heil et al. | 293—73 XR |
| 1,528,688 | 3/1925 | Oler | 298—38 XR |
| 1,754,104 | 4/1930 | Hoffman | 293—73 |
| 3,436,096 | 4/1969 | Rogge | 280—150 |

ARTHUR L. LAPOINT, Primary Examiner

HOWARD BELTRAN, Assistant Examiner

U.S. Cl. X.R.

280—150; 293—28; 298—38